United States Patent
Karaki et al.

(10) Patent No.: US 12,082,254 B2
(45) Date of Patent: Sep. 3, 2024

(54) SIGNALLING CHANNEL ACCESS PARAMETERS FOR UPLINK TRANSMISSIONS

(71) Applicant: Telefonaktiebolaget LM Ericsson (publ), Stockholm (SE)

(72) Inventors: Reem Karaki, Aachen (DE); Min Wang, Luleå (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 304 days.

(21) Appl. No.: 17/620,997

(22) PCT Filed: Jun. 26, 2020

(86) PCT No.: PCT/EP2020/068028
§ 371 (c)(1),
(2) Date: Dec. 20, 2021

(87) PCT Pub. No.: WO2020/260584
PCT Pub. Date: Dec. 30, 2020

(65) Prior Publication Data
US 2022/0330338 A1    Oct. 13, 2022

Related U.S. Application Data

(60) Provisional application No. 62/868,494, filed on Jun. 28, 2019.

(51) Int. Cl.
*H04W 74/0816* (2024.01)
*H04W 72/0453* (2023.01)
(Continued)

(52) U.S. Cl.
CPC ... *H04W 74/0816* (2013.01); *H04W 72/0453* (2013.01); *H04W 72/1263* (2013.01); *H04W 74/002* (2013.01); *H04W 74/0866* (2013.01)

(58) Field of Classification Search
CPC ......... H04W 74/0816; H04W 72/0453; H04W 72/1263; H04W 74/002; H04W 74/0866; H04W 74/0808; H04W 74/006
See application file for complete search history.

(56) References Cited

U.S. PATENT DOCUMENTS

2017/0353972 A1    12/2017  Babaei et al.
2019/0150196 A1     5/2019  Koorapaty et al.
(Continued)

FOREIGN PATENT DOCUMENTS

| EP | 3499976 A1 | 6/2019 |
|---|---|---|
| TW | 201902248 A | 1/2019 |
| TW | 201924429 A | 6/2019 |

OTHER PUBLICATIONS

3GPP, "3GPP TS 38.214 V15.6.0", 3rd Generation Partnership Project; Technical Specification Group Radio Access Network; NR; Physical layer procedures for data (Release 15), Jun. 2019, 1-105.

(Continued)

*Primary Examiner* — Yu-Wen Chang
(74) *Attorney, Agent, or Firm* — Sage Patent Group

(57) ABSTRACT

A wireless device (30) receives control information (28) that jointly encodes respective values for two or more channel access parameters. The two or more channel access parameters govern performance by the wireless device (30) of a listen-before-talk, LBT, procedure prior to an uplink transmission (32) in a radio resource allocation (34). In some embodiments, a mapping (40) maps different indices to different combinations of values for the two or more channel access parameters. In this case, the control information (28) may comprise an index mapped by the mapping (40) to one of the different combinations of values for the two or more channel access parameters. Regardless, the wireless device (Continued)

(30) may perform the LBT procedure (or not) according to the received control information (28).

17 Claims, 21 Drawing Sheets

(51) Int. Cl.
*H04W 72/1263* (2023.01)
*H04W 74/00* (2009.01)
*H04W 74/08* (2009.01)

(56) References Cited

U.S. PATENT DOCUMENTS

| | | | | |
|---|---|---|---|---|
| 2019/0174548 | A1* | 6/2019 | Jiang | H04W 52/02 |
| 2019/0313383 | A1* | 10/2019 | Xiong | H04W 16/14 |
| 2020/0205195 | A1* | 6/2020 | Sun | H04W 74/0808 |
| 2020/0245353 | A1* | 7/2020 | Tsai | H04W 72/1268 |
| 2020/0313946 | A1* | 10/2020 | Sun | H04W 56/0045 |
| 2022/0210835 | A1* | 6/2022 | Lin | H04L 27/2607 |
| 2023/0044448 | A1* | 2/2023 | Lin | H04W 16/14 |

OTHER PUBLICATIONS

Author Unknown, "doc.: IEEE 802.11-19/0920r0", LBT for a 16us gap after a DL transmission and before a UL transmission in a gNB-initiated COT, Submission, Slide 8, May 2019, 1.

Nokia, et al., "Feature Lead's Summary on Channel Access Procedures", 3GPP TSG RAN WG1 Meeting #97, R1-190664, Reno, US, May 13-17, 2019, 1-21.

Zte, et al., "Discussion on channel access procedure for NR-U", 3GPP TSG RAN WG1 Meeting #97, R1-1905951, Reno, USA, May 13-17, 2019, 1-12.

* cited by examiner

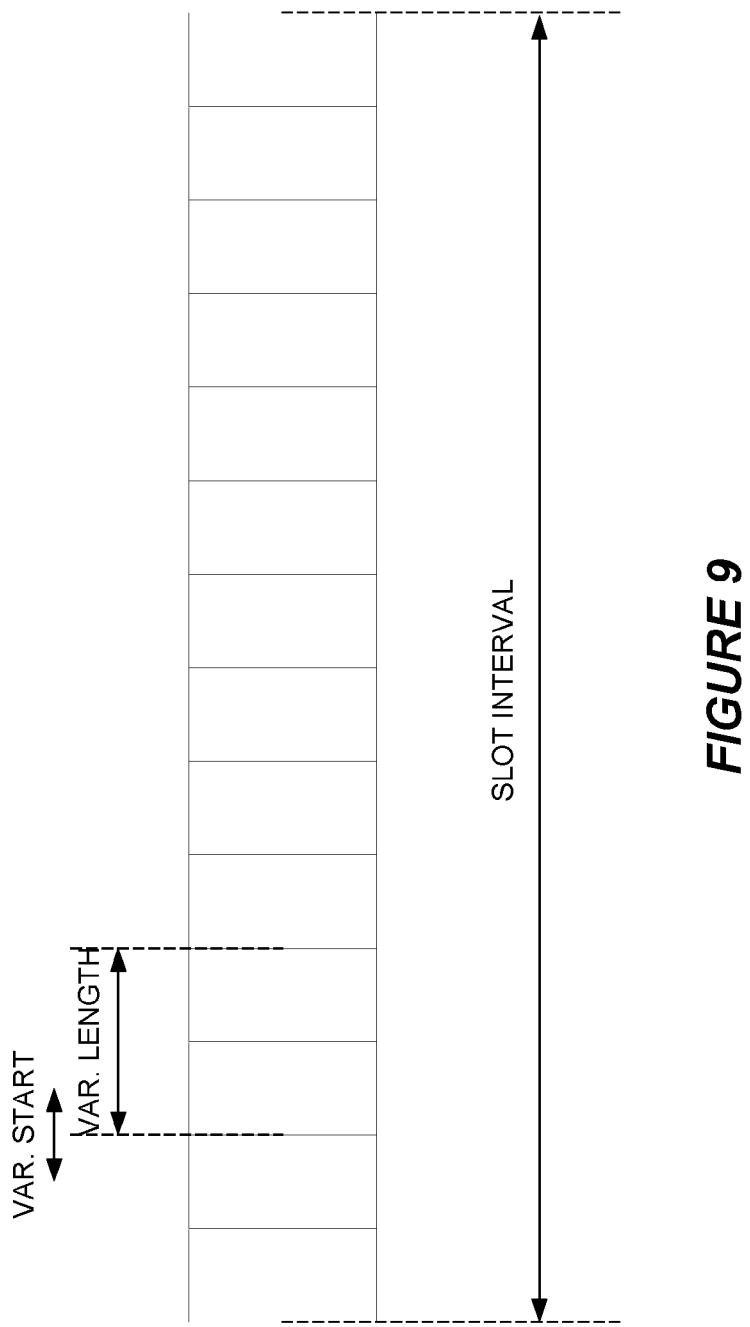

SIGNALLING CHANNEL ACCESS PARAMETERS FOR UPLINK TRANSMISSIONS

TECHNICAL FIELD

The present application relates generally wireless communication, and relates more particularly to the signaling of channel access parameters for such communication.

BACKGROUND

Before a transmitter is allowed to transmit within a channel occupancy time (COT) period in unlicensed frequency spectrum, the transmitter generally must determine that the spectrum is clear, e.g., based on a channel sensing procedure, also generically referred to as a listen-before-talk (LBT) procedure. However, according to a shared COT approach, after a transmitter controls a COT period by initiating transmission within that COT period, the transmitter may share that COT period with another transmitter, so that the other transmitter does not have to itself perform a channel sensing procedure (or as long of one). This advantageously reduces transmission latency for the other transmitter and/or avoids wasting resources that may have otherwise gone unused.

The shared COT approach nonetheless threatens to increase signalling overhead.

SUMMARY

Some embodiments herein jointly encode respective values for two or more channel access parameters. In some embodiments, the two or more channel access parameters govern performance by a wireless device of a listen-before-talk (LBT) procedure, e.g., prior to an uplink transmission in a radio resource allocation. The two or more channel access parameters may include for instance two or more of: (i) a type of the LBT procedure, if any, that the wireless device must successfully complete before performing the uplink transmission in the radio resource allocation; (ii) one or more priorities to be used for the LBT procedure; (iii) whether or not the wireless device is to extend or puncture the start of the uplink transmission in the radio resource allocation; or (iv) an energy detection threshold to be used for the LBT procedure. Regardless, the joint encoding of the channel access parameter values may advantageously minimize the signaling overhead required to convey those parameter values, even in a COT sharing context.

More particularly, embodiments herein include a method performed by a wireless device. The method includes receiving control information that jointly encodes respective values for two or more channel access parameters. In some embodiments, the two or more channel access parameters govern performance by the wireless device of a listen-before-talk, LBT, procedure prior to an uplink transmission in a radio resource allocation.

In some embodiments, the two or more channel access parameters include two or more of: (i) a type of the LBT procedure, if any, that the wireless device must successfully complete before performing the uplink transmission in the radio resource allocation; (ii) one or more priorities to be used for the LBT procedure; (iii) whether or not the wireless device is to extend or puncture the start of the uplink transmission in the radio resource allocation; or (iv) an energy detection threshold to be used for the LBT procedure. In one such embodiment, the one or more priorities include one or more LBT priority classes, one or more logical channels, and/or one or more quality of service class indicators.

In some embodiments, the two or more channel access parameters include: (i) a type of the LBT procedure, if any, that the wireless device must successfully complete before performing the uplink transmission in the radio resource allocation; and (ii) a cyclic prefix extension, if any, to extend the start of the uplink transmission in the radio resource allocation.

In some embodiments, the method also comprises performing the LBT procedure (or not) according to the received control information.

In one or more embodiments, such as if the LBT procedure is performed, the method also comprises performing or not performing the uplink transmission in the radio resource allocation depending on whether or not the LBT procedure succeeds.

In some embodiments, the control information comprises Downlink Control Information, DCI.

In some embodiments, a mapping maps different indices to different combinations of values for the two or more channel access parameters. In this case, the control information comprises an index mapped by said mapping to one of the different combinations of values for the two or more channel access parameters. In one or more embodiments, then, the method may also comprise receiving signaling indicating the mapping. This signaling may for instance be RRC signaling or system information signaling.

In some embodiments, the control information also individually encodes one or more respective values for one or more of the two or more channel access parameters. In this case, the method may further comprise, for any channel access parameter whose value is both individually encoded and jointly encoded by the control information, determining a value for the channel access parameter from the individual encoding of that channel access parameter.

In some embodiments, the radio resource allocation is in unlicensed frequency spectrum.

In some embodiments, different combinations of values for the two or more channel access parameters are associated with respective logical channels. In one such embodiment, the method may further comprise selecting, from one or more logical channels associated with a combination of values for the two or more channel access parameters jointly encoded by the control information, data for the uplink transmission in the radio resource allocation.

In some embodiments, the control information is included in a control information message that indicates the radio resource allocation to the wireless device.

In some embodiments, the two or more channel access parameters govern performance by the wireless device of an LBT procedure prior to an uplink transmission in any of multiple radio resource allocations.

In some embodiments, the two or more channel access parameters govern performance of an LBT procedure by the wireless device when a channel occupancy time, COT, on an unlicensed frequency channel is shared.

Embodiments herein also include a method performed by a network node. The method includes transmitting, to a wireless device, control information that jointly encodes respective values for two or more channel access parameters. In some embodiments, the two or more channel access parameters govern performance by the wireless device of a listen-before-talk, LBT, procedure prior to an uplink transmission in a radio resource allocation.

In some embodiments, the two or more channel access parameters include two or more of: (i) a type of the LBT procedure, if any, that the wireless device must successfully complete before performing the uplink transmission in the radio resource allocation; (ii) one or more priorities to be used for the LBT procedure; (iii) whether or not the wireless device is to extend or puncture the start of the uplink transmission in the radio resource allocation; or (iv) an energy detection threshold to be used for the LBT procedure. In one such embodiment, the one or more priorities include one or more LBT priority classes, one or more logical channels, and/or one or more quality of service class indicators.

In some embodiments, the two or more channel access parameters include: (i) a type of the LBT procedure, if any, that the wireless device must successfully complete before performing the uplink transmission in the radio resource allocation; and (ii) a cyclic prefix extension, if any, to extend the start of the uplink transmission in the radio resource allocation.

In some embodiments, the method also comprises determining the respective values for the two or more channel access parameters.

In some embodiments, the method may further comprise jointly encoding the respective values for the two or more channel access parameters.

In some embodiments, the control information comprises Downlink Control Information, DCI.

In some embodiments, a mapping maps different indices to different combinations of values for the two or more channel access parameters. In this case, the control information comprises an index mapped by said mapping to one of the different combinations of values for the two or more channel access parameters. In one or more embodiments, then, the method may also comprise transmitting signaling indicating the mapping. This signaling may for instance be RRC signaling or system information signaling.

In some embodiments, the control information also individually encodes one or more respective values for one or more of the two or more channel access parameters. In this case, for any channel access parameter that is both individually encoded and jointly encoded by the control information, a value of the channel access parameter as individually encoded overrides a value of the channel access parameter as jointly encoded.

In some embodiments, the radio resource allocation is in unlicensed frequency spectrum.

In some embodiments, different combinations of values for the two or more channel access parameters are associated with respective logical channels.

In some embodiments, the control information is included in a control information message that indicates the radio resource allocation to the wireless device.

In some embodiments, the two or more channel access parameters govern performance by the wireless device of an LBT procedure prior to an uplink transmission in any of multiple radio resource allocations.

In some embodiments, the two or more channel access parameters govern performance of an LBT procedure by the wireless device when a channel occupancy time, COT, on an unlicensed frequency channel is shared. In some embodiments, the method further comprises receiving the uplink transmission.

Embodiments herein also include corresponding apparatus, computer programs, and carriers of those computer programs. For example, embodiments include a wireless device, e.g., comprising communication circuitry and processing circuitry. The wireless device is configured to receive control information that jointly encodes respective values for two or more channel access parameters. In some embodiments, the two or more channel access parameters govern performance by the wireless device of a listen-before-talk, LBT, procedure prior to an uplink transmission in a radio resource allocation.

Embodiments herein also include a network node, e.g., comprising communication circuitry and processing circuitry. The network node is configured to transmit, to a wireless device, control information that jointly encodes respective values for two or more channel access parameters. In some embodiments, the two or more channel access parameters govern performance by the wireless device of a listen-before-talk, LBT, procedure prior to an uplink transmission in a radio resource allocation.

BRIEF DESCRIPTION OF THE DRAWINGS

FIG. 9 is a block diagram of a mini-slot according to some embodiments.

DETAILED DESCRIPTION

Figure 1:
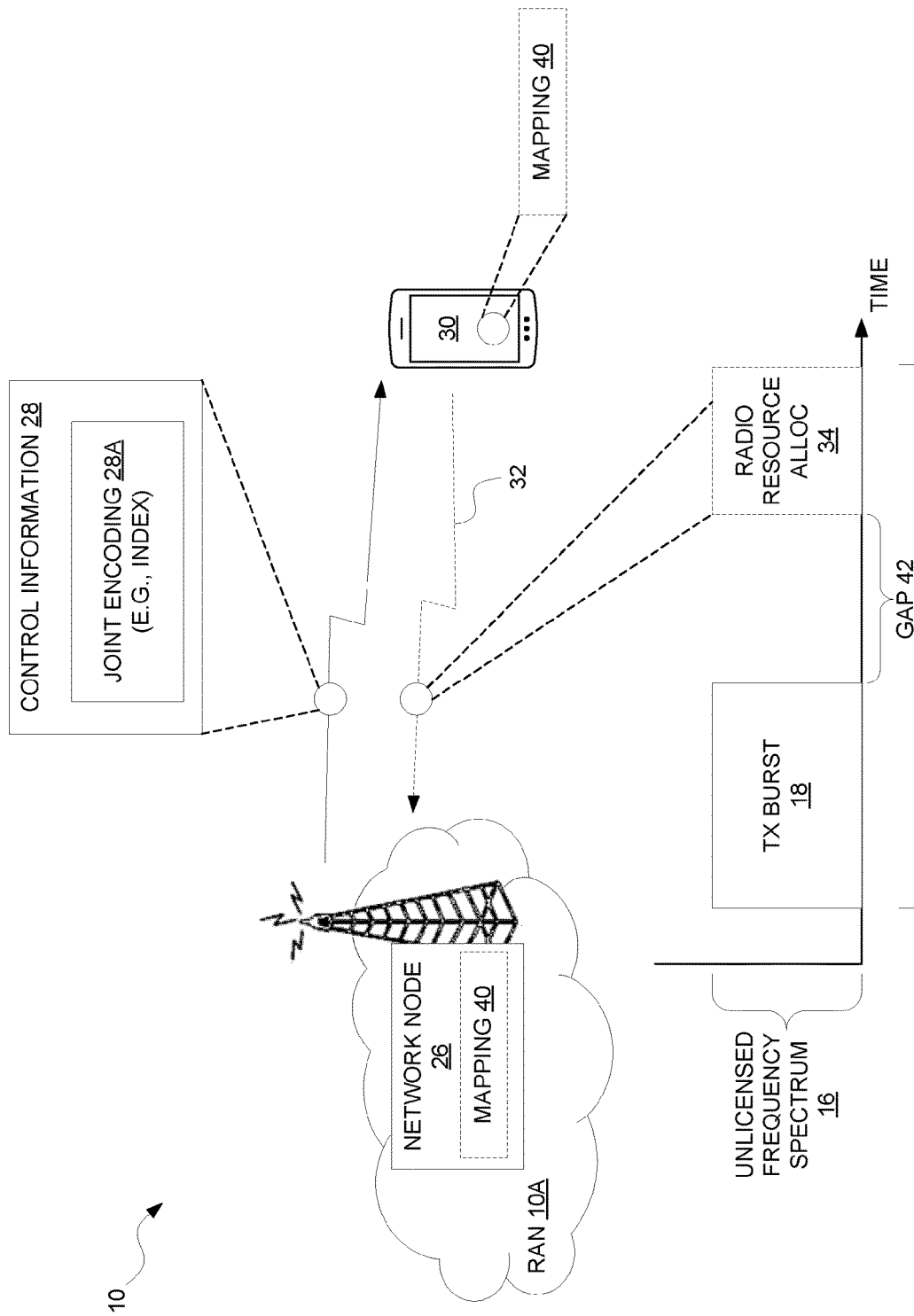
FIG. 1 is a block diagram of a wireless communication network according to some embodiments.

FIG. 1 shows a wireless communication system 10 (e.g., a New Radio Unlicensed, NR-U, system) according to some embodiments. The system 10 as shown includes a radio access network (RAN) 10A that provides radio access to one or more wireless devices and a core network (CN) (not shown) that interconnects the RAN 10A to one or more other networks (e.g., the Internet).

The RAN 10A is configured to provide radio access at least on unlicensed frequency spectrum 16. Generally, before a transmitter performs a transmission on this unlicensed frequency spectrum 16, the transmitter must determine that the spectrum 16 is clear, e.g., based on a Listen-Before-Talk (LBT) procedure. If the spectrum 16 is clear, the transmitter may transmit a transmission burst within a channel occupancy time (COT) period. FIG. 1 for example shows a transmission (TX) burst 18 transmitted within a COT period 20 on the unlicensed frequency spectrum 16. This transmission burst 18 in some embodiments is a downlink transmission burst, whereas in other embodiments the transmission burst 18 may be an uplink transmission burst. In either case, the transmission burst 18 may be considered as a set of one or more transmissions, where the gap (if any) between each transmission is less than a threshold (e.g., 16 us).

If the transmission burst 18 does not occupy the full COT period 20, the COT period 20 may be shared so that one or more other transmissions can be performed within the COT period 20, without those transmission(s) being conditioned on performance of an LBT procedure (or at least as long of one). This advantageously reduces transmission latency for the other transmission(s) and/or avoids wasting resources that may have otherwise gone unused. That said, whether the other transmissions can be performed without an LBT procedure and/or the sensing duration within that LBT procedure may depend on various conditions, including the gap between the transmission burst and the other transmissions, as well as the priorities given to the other transmissions.

Notably, according to some embodiments herein, a network node 26 (e.g., the same radio network node that transmits or receives the transmission burst 18 in COT period 20) is configured to transmit control information 28. A wireless device 30 is correspondingly configured to monitor for and/or receive this control information 28. In one or more embodiments, the control information 28 comprises Downlink Control Information (DCI), e.g., within a DCI message that indicates a radio resource allocation 34 to the wireless device 30.

In some embodiments, the control information 28 jointly encodes respective values for two or more channel access parameters, e.g., as a sort of "channel access profile". As shown for instance the control information 28 comprises joint encoding 28A. The two or more channel access parameters govern performance by the wireless device 30 of an LBT procedure, e.g., prior to an uplink transmission 32 in a radio resource allocation 34.

The two or more channel access parameters may include for instance two or more of: (i) a type of the LBT procedure, if any, that the wireless device 30 must successfully complete before performing the uplink transmission 32 in the radio resource allocation 34; (ii) one or more priorities to be used for the LBT procedure; (iii) whether or not the wireless device 30 is to extend or puncture the start of the uplink transmission 32 in the radio resource allocation 34; or (iv) an energy detection threshold to be used for the LBT procedure. Regardless, the joint encoding of the channel access parameter values may advantageously minimize the signaling overhead required to convey those parameter values, even in a COT sharing context.

In fact, in some embodiments, a mapping 40 maps different indices to different combinations of values for the two or more channel access parameters. The network node 26 and the wireless device 30 may store this mapping 40. For example, the network node 26 may transmit control signaling (e.g., RRC signaling) to the wireless device 30 indicating the mapping 40, e.g., on a semi-static basis. Regardless, the control information 28 in some embodiments comprises an index mapped by the mapping 40 to one of the different combinations of values for the two or more channel access parameters.

In some embodiments, the network node 26 determines the respective values for the two or more channel access parameters, e.g., by selecting which index from the mapping 40 to signal. The network node 26 in some embodiments makes this determination based on the length of a gap 42 between the end of the transmission burst 18 and the start of the radio resource allocation 34 (i.e., the scheduled resource allocation). If for example the length of the gap 42 is less than or equal to 16 us, the respective values for the two or more channel access parameters may differ from the case where the length of the gap is more than 16 us. For instance, the network node 26 may signal via the control information 28 that the wireless device 30 need not perform an LBT procedure (i.e., LBT Cat 1) if the gap is less than 16 us.

Figure 2:
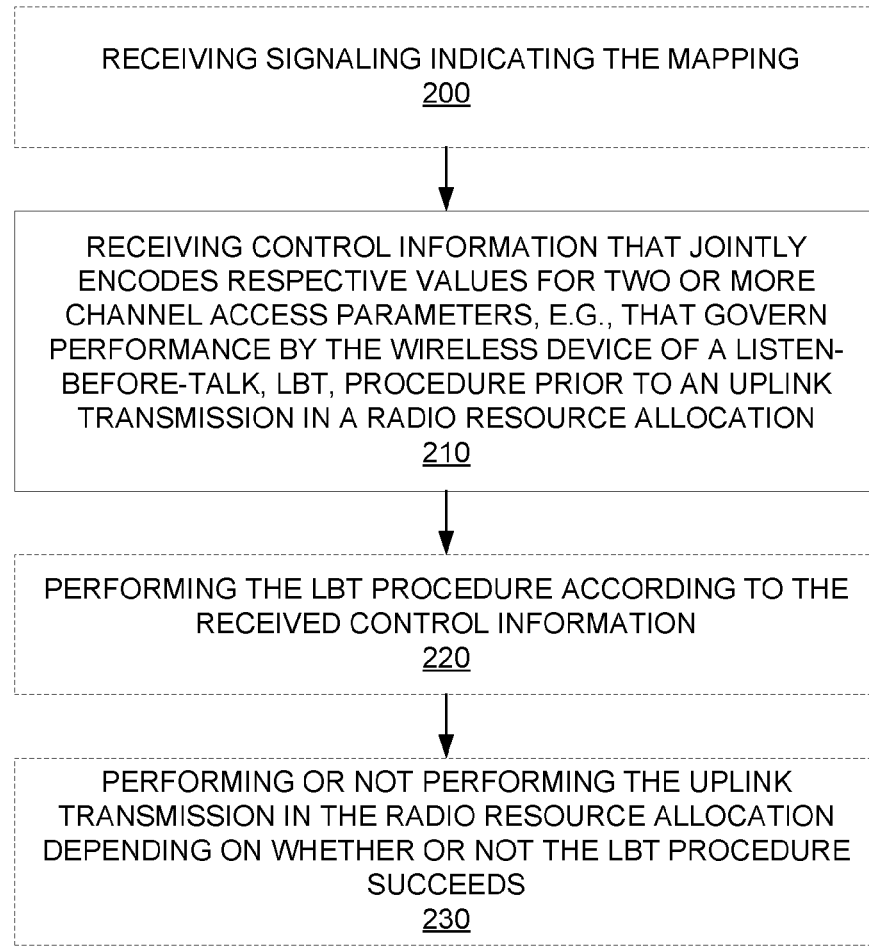
FIG. 2 is a logic flow diagram of a method performed by a wireless device according to some embodiments.

In view of the above modifications and variations, FIG. 2 depicts a method performed by a wireless device 30 in accordance with particular embodiments. The method includes receiving control information 28 that jointly encodes respective values for two or more channel access parameters (Block 210). In some embodiments, the two or more channel access parameters govern performance by the wireless device 30 of a listen-before-talk, LBT, procedure prior to an uplink transmission 32 in a radio resource allocation 34. In some embodiments, the method also comprises performing the LBT procedure (or not) according to the received control information 28 (Block 220). In one or more embodiments, such as if the LBT procedure is performed, the method also comprises performing or not performing the uplink transmission 32 in the radio resource allocation 34 depending on whether or not the LBT procedure succeeds (Block 230).

In some embodiments, a mapping 40 maps different indices to different combinations of values for the two or more channel access parameters. In this case, the control information 28 comprises an index mapped by said mapping 40 to one of the different combinations of values for the two or more channel access parameters. In one or more embodiments, then, the method may also comprise receiving signaling indicating the mapping 40 (Block 200). This signaling may for instance be RRC signaling or system information signaling.

In some embodiments, the two or more channel access parameters include two or more of: (i) a type of the LBT procedure, if any, that the wireless device must successfully complete before performing the uplink transmission in the radio resource allocation; (ii) one or more priorities to be used for the LBT procedure; (iii) whether or not the wireless device is to extend or puncture the start of the uplink transmission in the radio resource allocation; or (iv) an energy detection threshold to be used for the LBT procedure. In one such embodiment, the one or more priorities include one or more LBT priority classes, one or more logical channels, and/or one or more quality of service class indicators.

In some embodiments, the control information comprises Downlink Control Information, DCI.

In some embodiments, the control information also individually encodes one or more respective values for one or more of the two or more channel access parameters. In this case, the method may further comprise, for any channel access parameter whose value is both individually encoded and jointly encoded by the control information, determining a value for the channel access parameter from the individual encoding of that channel access parameter.

In some embodiments, the radio resource allocation is in unlicensed frequency spectrum.

In some embodiments, different combinations of values for the two or more channel access parameters are associated with respective logical channels. In one such embodiment, the method may further comprise selecting, from one or more logical channels associated with a combination of values for the two or more channel access parameters jointly encoded by the control information, data for the uplink transmission in the radio resource allocation.

In some embodiments, the control information is included in a control information message that indicates the radio resource allocation to the wireless device.

In some embodiments, the two or more channel access parameters govern performance by the wireless device of an LBT procedure prior to an uplink transmission in any of multiple radio resource allocations.

In some embodiments, the two or more channel access parameters govern performance of an LBT procedure by the wireless device when a channel occupancy time, COT, on an unlicensed frequency channel is shared.

Figure 3:
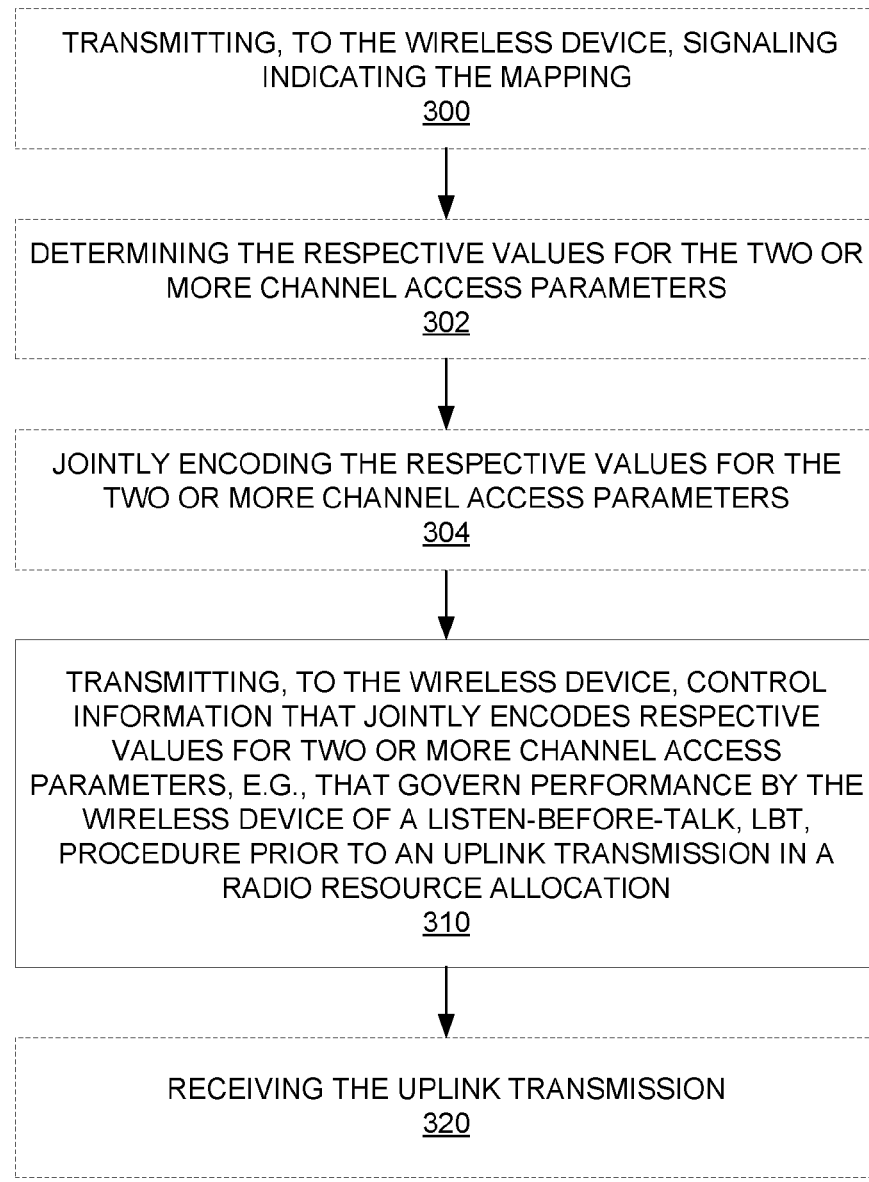
FIG. 3 is a logic flow diagram of a method performed by a network node according to some embodiments.

FIG. 3 depicts a method performed by a network node 26 in accordance with other particular embodiments. The method includes transmitting, to a wireless device 30, control information 28 that jointly encodes respective values for two or more channel access parameters (Block 310). In some embodiments, the two or more channel access parameters govern performance by the wireless device 30 of a listen-before-talk, LBT, procedure prior to an uplink transmission 32 in a radio resource allocation 34. In some embodiments, the method also comprises determining the respective values for the two or more channel access parameters (Block 302). The method may further comprise jointly encoding the respective values for the two or more channel access parameters (Block 304).

In some embodiments, a mapping 40 maps different indices to different combinations of values for the two or more channel access parameters. In this case, the control information comprises an index mapped by said mapping 40 to one of the different combinations of values for the two or more channel access parameters. In one or more embodiments, then, the method may also comprise transmitting signaling indicating the mapping 40 (Block 300). This signaling may for instance be RRC signaling or system information signaling.

In some embodiments, the two or more channel access parameters include two or more of: (i) a type of the LBT procedure, if any, that the wireless device must successfully complete before performing the uplink transmission in the radio resource allocation; (ii) one or more priorities to be used for the LBT procedure; (iii) whether or not the wireless device is to extend or puncture the start of the uplink transmission in the radio resource allocation; or (iv) an energy detection threshold to be used for the LBT procedure. In one such embodiment, the one or more priorities include one or more LBT priority classes, one or more logical channels, and/or one or more quality of service class indicators.

In some embodiments, the control information comprises Downlink Control Information, DCI.

In some embodiments, the control information also individually encodes one or more respective values for one or more of the two or more channel access parameters. In this case, for any channel access parameter that is both individually encoded and jointly encoded by the control information, a value of the channel access parameter as individually encoded overrides a value of the channel access parameter as jointly encoded.

In some embodiments, the radio resource allocation is in unlicensed frequency spectrum.

In some embodiments, different combinations of values for the two or more channel access parameters are associated with respective logical channels.

In some embodiments, the control information is included in a control information message that indicates the radio resource allocation to the wireless device.

In some embodiments, the two or more channel access parameters govern performance by the wireless device of an LBT procedure prior to an uplink transmission in any of multiple radio resource allocations.

In some embodiments, the two or more channel access parameters govern performance of an LBT procedure by the wireless device when a channel occupancy time, COT, on an unlicensed frequency channel is shared.

In some embodiments, the method further comprises receiving the uplink transmission (Block 320).

Embodiments herein also include corresponding apparatuses. Embodiments herein for instance include a wireless device configured to perform any of the steps of any of the embodiments described above for the wireless device.

Embodiments also include a wireless device comprising processing circuitry and power supply circuitry. The processing circuitry is configured to perform any of the steps of any of the embodiments described above for the wireless device. The power supply circuitry is configured to supply power to the wireless device.

Embodiments further include a wireless device 30 comprising processing circuitry. The processing circuitry is configured to perform any of the steps of any of the embodiments described above for the wireless device 30. In some embodiments, the wireless device 30 further comprises communication circuitry.

Embodiments further include a wireless device 30 comprising processing circuitry and memory. The memory contains instructions executable by the processing circuitry whereby the wireless device 30 is configured to perform any of the steps of any of the embodiments described above for the wireless device 30.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device 30. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a network node 26 configured to perform any of the steps of any of the embodiments described above for the network node 26.

Embodiments also include a network node 26 comprising processing circuitry and power supply circuitry. The processing circuitry is configured to perform any of the steps of any of the embodiments described above for the network node 26. The power supply circuitry is configured to supply power to the network node 26.

Embodiments further include a network node 26 comprising processing circuitry. The processing circuitry is configured to perform any of the steps of any of the embodiments described above for the network node 26. In some embodiments, the network node 26 further comprises communication circuitry.

Embodiments further include a network node 26 comprising processing circuitry and memory. The memory contains instructions executable by the processing circuitry whereby the network node 26 is configured to perform any of the steps of any of the embodiments described above for the network node 26.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 4:
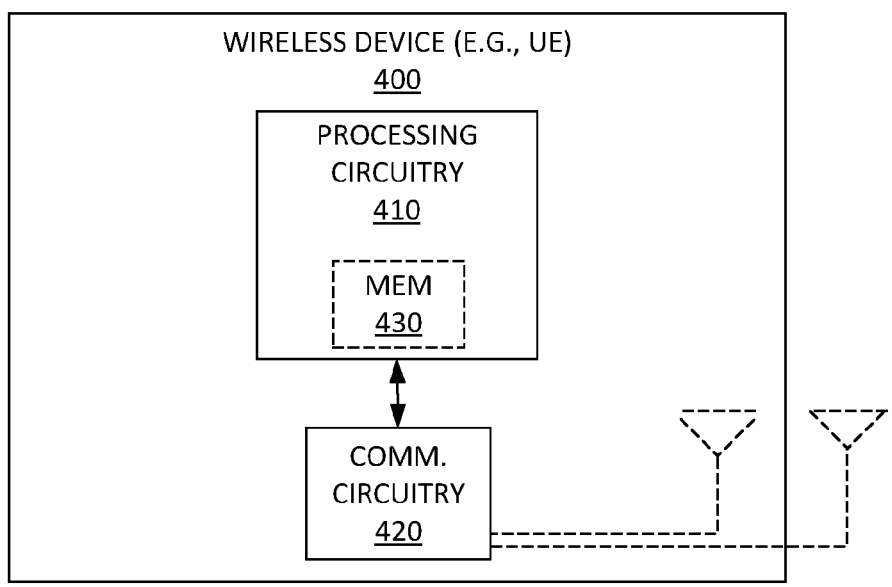
FIG. 4 is a block diagram of a wireless device according to some embodiments.

FIG. 4 for example illustrates a wireless device 400 (e.g., wireless device 30) as implemented in accordance with one or more embodiments. As shown, the wireless device 400 includes processing circuitry 410 and communication circuitry 420. The communication circuitry 420 (e.g., radio circuitry) is configured to transmit and/or receive information to and/or from one or more other nodes, e.g., via any communication technology. Such communication may occur via one or more antennas that are either internal or external to the wireless device 400. The processing circuitry 410 is configured to perform processing described above, such as by executing instructions stored in memory 430. The processing circuitry 410 in this regard may implement certain functional means, units, or modules.

Figure 5:
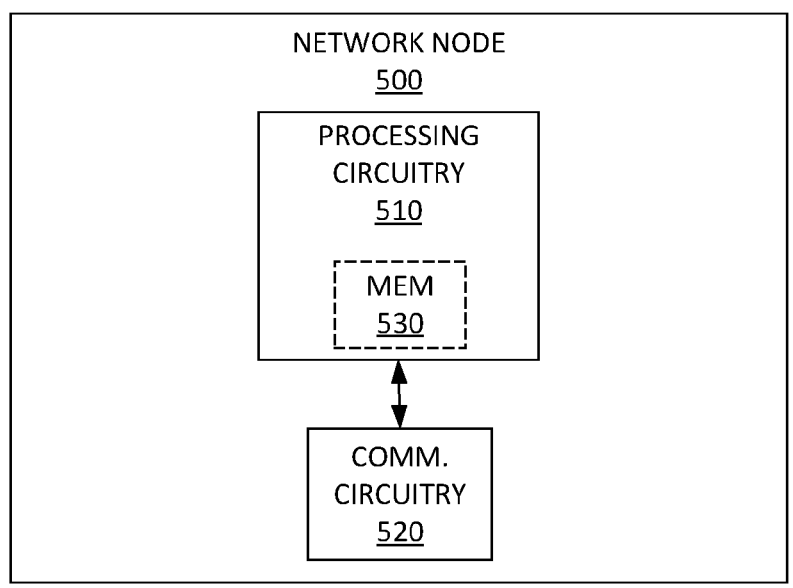
FIG. 5 is a block diagram of a network node according to some embodiments.

FIG. 5 illustrates a network node 500 (e.g., network node 26) as implemented in accordance with one or more embodiments. As shown, the network node 500 includes processing circuitry 510 and communication circuitry 520. The communication circuitry 520 is configured to transmit and/or receive information to and/or from one or more other nodes, e.g., via any communication technology. The processing circuitry 510 is configured to perform processing described above, such as by executing instructions stored in memory 530. The processing circuitry 510 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described. In the below embodiments, a user equipment (UE) may exemplify the wireless device 30 in FIG. 1, a gNB may exemplify the network node 26 in FIG. 1, and a channel access profile may exemplify a combination of two or more channel access parameters that are jointly encoded and indicated by the control information 28 in FIG. 1.

More particularly, some embodiments herein are applicable in a New Radio (NR) context. The new radio (NR)

standard in 3GPP is being designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is shorter transmission time intervals. In NR, in addition to transmission in a slot, a mini-slot transmission is also allowed to reduce latency. A mini-slot may consist of any number of 1 to 14 Orthogonal Frequency Division Multiplexing (OFDM) symbols. It should be noted that the concepts of slot and mini-slot are not specific to a specific service meaning that a mini-slot may be used for either eMBB, URLLC, or other services.

Resource Blocks

In Rel-15 NR, a UE can be configured with up to four carrier bandwidth parts in the downlink with a single downlink carrier bandwidth part being active at a given time. A UE can be configured with up to four carrier bandwidth parts in the uplink with a single uplink carrier bandwidth part being active at a given time. If a UE is configured with a supplementary uplink, the UE can in addition be configured with up to four carrier bandwidth parts in the supplementary uplink with a single supplementary uplink carrier bandwidth part being active at a given time.

Figure 6:
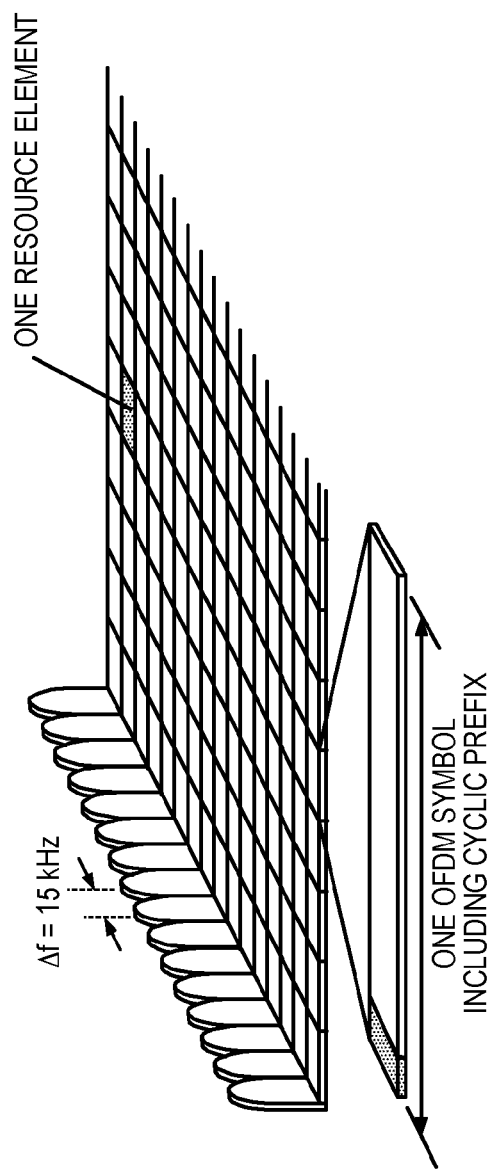
FIG. 6 is a block diagram of a resource block according to some embodiments.

For a carrier bandwidth part with a given numerology $\mu_i$, a contiguous set of physical resource blocks (PRBs) are defined and numbered from 0 to $N_{BWP,i}^{size}-1$, where i is the index of the carrier bandwidth part. A resource block (RB) is defined as 12 consecutive subcarriers in the frequency domain. FIG. 6 shows one example of a RB according to some embodiments.

Numerologies

Multiple OFDM numerologies, $\mu$, are supported in NR as given by Table 1, where the subcarrier spacing, $\Delta f$, and the cyclic prefix for a carrier bandwidth part are configured by different higher layer parameters for downlink and uplink, respectively.

TABLE 1

Supported transmission numerologies.

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Physical Channels

A downlink physical channel corresponds to a set of resource elements carrying information originating from higher layers. The following downlink physical channels are defined:

Physical Downlink Shared Channel, PDSCH
Physical Broadcast Channel, PBCH
Physical Downlink Control Channel, PDCCH:

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI), mainly scheduling decisions, required for reception of PDSCH, and for uplink scheduling grants enabling transmission on PUSCH.

An uplink physical channel corresponds to a set of resource elements carrying information originating from higher layers. The following uplink physical channels are defined:

Physical Uplink Shared Channel, PUSCH:
Physical Uplink Control Channel, PUCCH
Physical Random Access Channel, PRACH PUSCH is the uplink counterpart to the PDSCH. PUCCH is used by UEs to transmit uplink control information, including hybrid automatic repeat request (HARQ) acknowledgements, channel state information reports, etc. PRACH is used for random access preamble transmission.

Frequency Resource Allocation for PUSCH

In general, a UE shall determine the RB assignment in frequency domain for PUSCH or PDSCH using the resource allocation field in the detected DCI carried in PDCCH. For PUSCH carrying msg3 in a random-access procedure, the frequency domain resource assignment is signaled by using the UL grant contained in RAR.

In NR, two frequency resource allocation schemes, type 0 and type 1, are supported for PUSCH and PDSCH. Which type to use for a PUSCH/PDSCH transmission is either defined by a radio resource control (RRC) configured parameter or indicated directly in the corresponding DCI or UL grant in RAR (for which type 1 is used).

The RB indexing for uplink/downlink type 0 and type 1 resource allocation is determined within the UE's active carrier bandwidth part, and the UE shall upon detection of PDCCH intended for the UE determine first the uplink/downlink carrier bandwidth part and then the resource allocation within the carrier bandwidth part. The UL bandwidth part (BWP) for PUSCH carrying msg3 is configured by higher layer parameters.

Time Resource Allocations for PUSCH

When the UE is scheduled to transmit a transport block, the Time domain resource assignment field value m of the DCI provides a row index m+1 to an allocated RRC configured table. The indexed row defines:
the slot offset $K_2$,
the start and length indicator SLIV, or directly the start symbol S and the allocation length L
the PUSCH mapping type to be applied in the PUSCH transmission.

The slot where the UE shall transmit the PUSCH is determined by K2 as $$\left\lfloor n \cdot \frac{2^{\mu_{PUSCH}}}{2^{\mu_{PDCCH}}} \right\rfloor + K_2$$

where n is the slot with the scheduling DCI, K2 is based on the numerology of PUSCH, and $\mu_{PUSCH}$ and $\mu_{PDCCH}$ are the subcarrier spacing configurations for PUSCH and PDCCH, respectively The starting symbol S relative to the start of the slot, and the number of consecutive symbols L counting from the symbol S allocated for the PUSCH are determined from the start and length indicator SLIV of the indexed row:

if $(L-1) \leq 7$ then $SLIV=14 \cdot (L-1)+S$ else $SLIV=14 \cdot (14-L+1)+(14-1-S)$ where $0 < L \leq 14-S$ The UE shall consider the S and L combinations defined in Table 2 as valid PUSCH allocations

TABLE 2

| | Valid S and L combinations | | | | | |
|---|---|---|---|---|---|---|
| PUSCH mapping | Normal cyclic prefix | | | Extended cyclic prefix | | |
| type | S | L | S + L | S | L | S + L |
| Type A | 0 | {4, ..., 14} | {4, ..., 14} | 0 | {4, ..., 12} | {4, ..., 12} |
| Type B | {0, ..., 13} | {1, ..., 14} | {1, ..., 14} | {0, ..., 12} | {1, ..., 12} | {1, ..., 12} |

Either a default PUSCH time domain allocation A according to Table 3, is applied, or the higher layer configured pusch-AllocationList in either pusch-ConfigCommon or pusch-Config is applied. j depends on the subcarrier spacing and is defined in table 4.

TABLE 3

Default PUSCH time domain resource allocation A for normal CP

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

TABLE 4

| Definition of value j | |
|---|---|
| $\mu_{PUSCH}$ | j |
| 0 | 1 |
| 1 | 1 |
| 2 | 2 |
| 3 | 3 |

```
-- ASN1START
-- TAG-PUSCH-TIMEDOMAINRESOURCEALLOCATIONLIST-START
PUSCH-TimeDomainResourceAllocationList ::=SEQUENCE (SIZE(1..
  maxNrofUL- Allocations)) OF PUSCH-TimeDomainResourceAllocation
PUSCH-TimeDomainResourceAllocation ::=SEQUENCE {
  k2                  INTEGER(0..32)    OPTIONAL, -- Need S
  mappingType         ENUMERATED {typeA, typeB},
  startSymbolAndLength INTEGER (0..127)
}
-- TAG-PUSCH-TIMEDOMAINRESOURCEALLOCATIONLIST-STOP
-- ASN1STOP
``` where the fields are defined as follows:

k2
  Corresponds to L1 parameter 'K2' (see TS 38.214 v15.6.0, clause 6.1.2.1) When the field is absent the UE applies the value 1 when PUSCH SCS is 15/30 kHz; the value 2 when PUSCH SCS is 60 kHz, and the value 3 when PUSCH SCS is 120 KHz.

mappingType
  Mapping type (see TS 38.214 v15.6.0, clause 6.1.2.1).
startSymbolAndLength
  An index giving valid combinations of start symbol and length (jointly encoded) as start and length indicator (SLIV). The network configures the field so that the allocation does not cross the slot boundary. (see TS 38.214 v15.6.0, clause 6.1.2.1).

Modulation Order, Redundancy Version and Transport Block Size Determination

To determine the modulation order, target code rate, redundancy version and transport block size for the physical uplink shared channel, the UE shall first
  read the 5-bit modulation and coding scheme field ($I_{MCS}$) in the DCI to determine the modulation order ($O_m$) and target code rate (R)
  read redundancy version field (rv) in the DCI to determine the redundancy version, and
  [check the "CSI request" bit field]
and second
  the UE shall use the number of layers (v), the total number of allocated PRBs ($n_{PRB}$) to determine the transport block size PDCCH Monitoring In 3GPP NR standard, downlink control information (DCI) is received over the physical layer downlink control channel (PDCCH). The PDCCH may carry DCI in messages with different formats. DCI format 0_0 and 0_1 are DCI messages used to convey uplink grants to the UE for transmission of the physical layer data channel in the uplink (PUSCH) and DCI format 1_0 and 1_1 are used to convey downlink grants for transmission of the physical layer data channel on the downlink (PDSCH). Other DCI formats (2_0, 2_1, 2_2 and 2_3) are used for other purposes such as transmission of slot format information, reserved resource, transmit power control information etc.

Slot Structure

Figure 7:
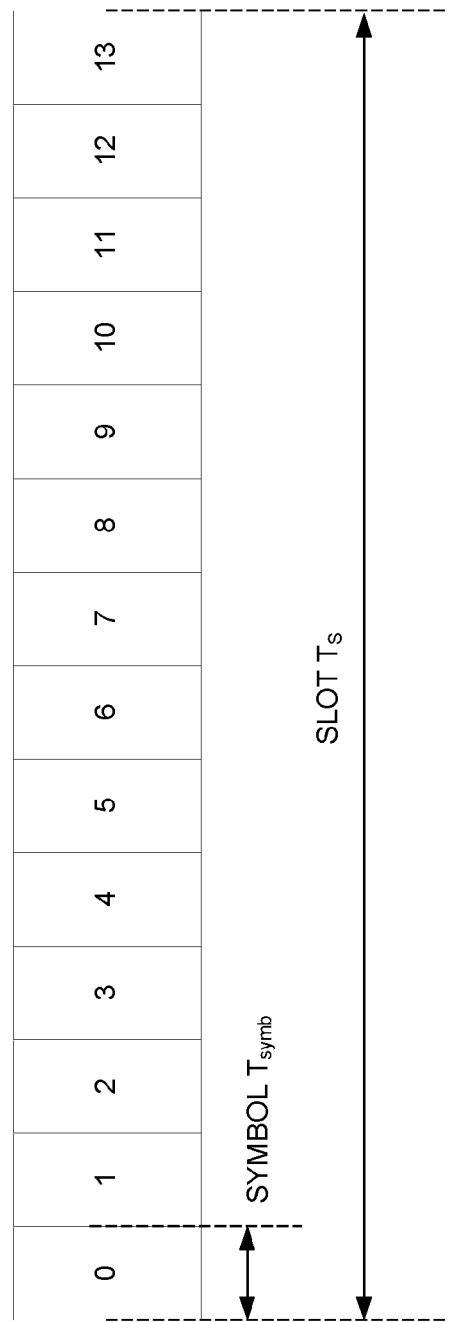
FIG. 7 is a block diagram of a subframe according to some embodiments.

An NR slot consists of several OFDM symbols, according to current agreements either 7 or 14 symbols (OFDM subcarrier spacing 60 kHz) and 14 symbols (OFDM subcarrier spacing >60 kHz). FIG. 7 shows a subframe with 14 OFDM symbols. In FIG. 7, $T_s$ and $T_{symb}$ denote the slot and OFDM symbol duration, respectively.

Figure 8A:
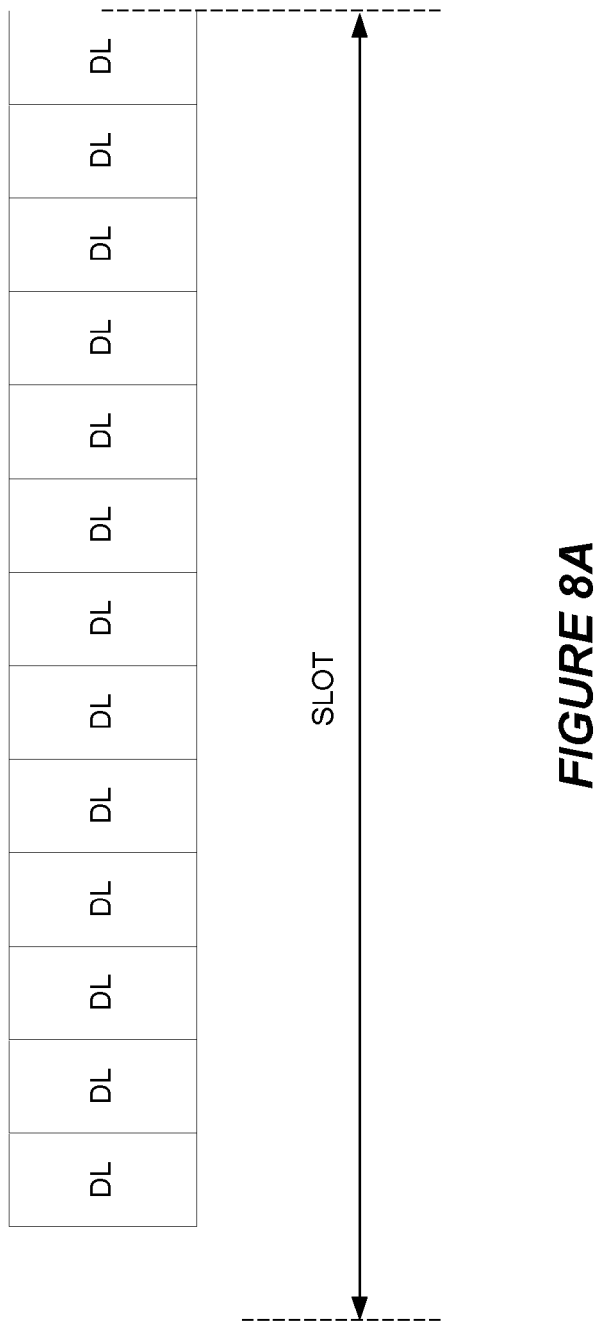
FIG. 8A is a block diagram of DL-only transmission with late start according to some embodiments.
Figure 8B:
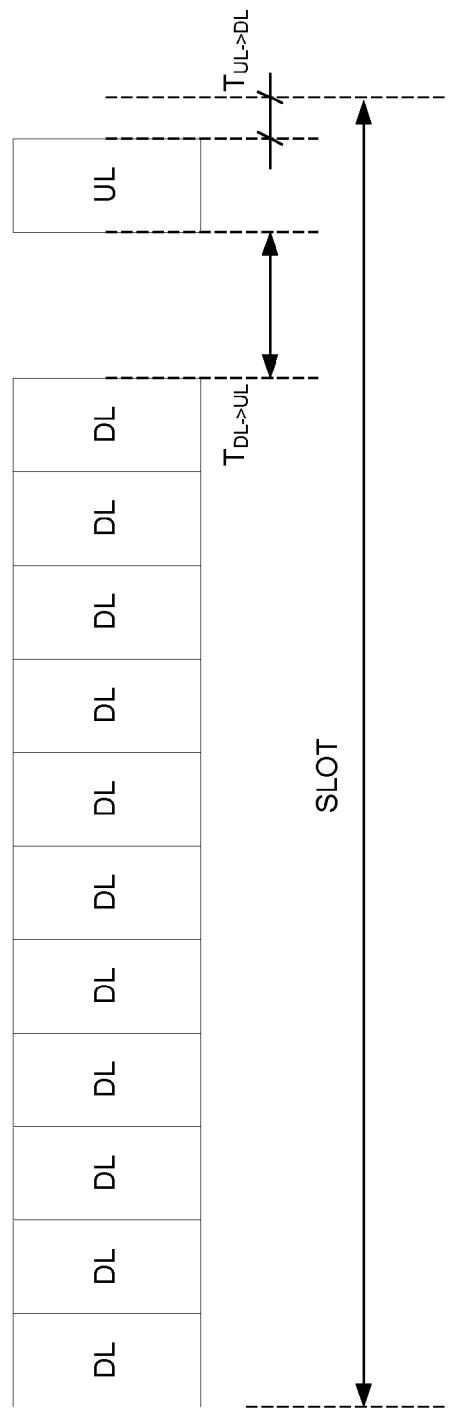
FIG. 8B is a block diagram of DL-heavy transmission with an UL part according to some embodiments.
Figure 8C:
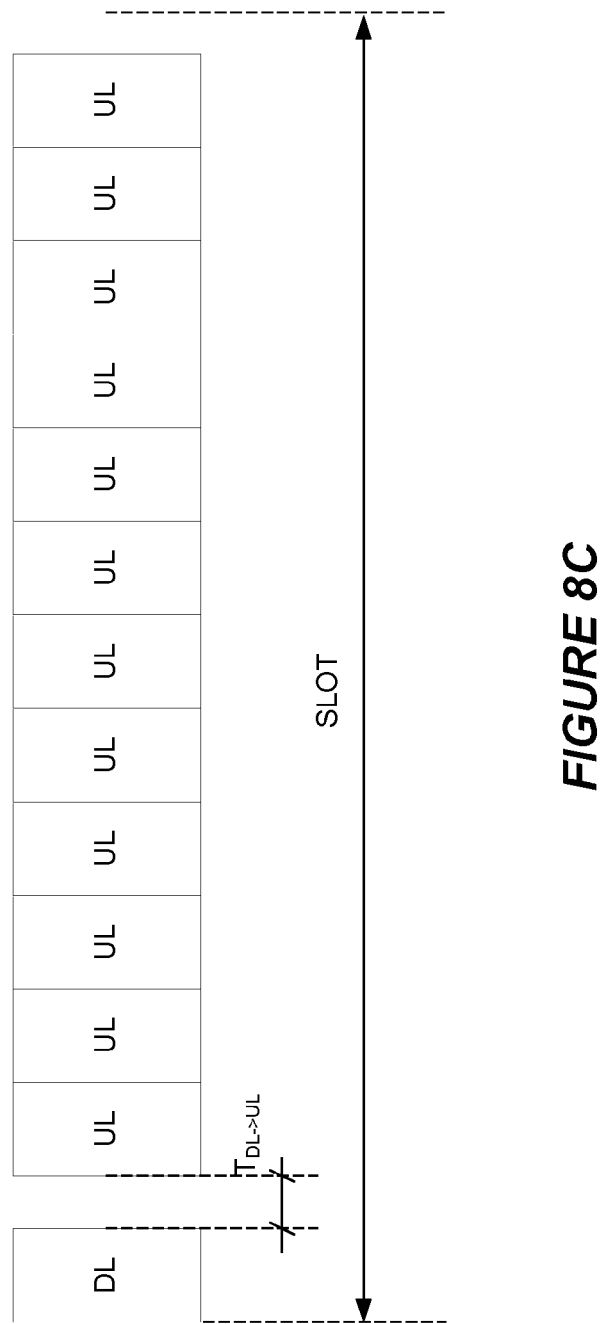
FIG. 8C is a block diagram of UL-heavy transmission with DL control according to some embodiments.
Figure 8D:
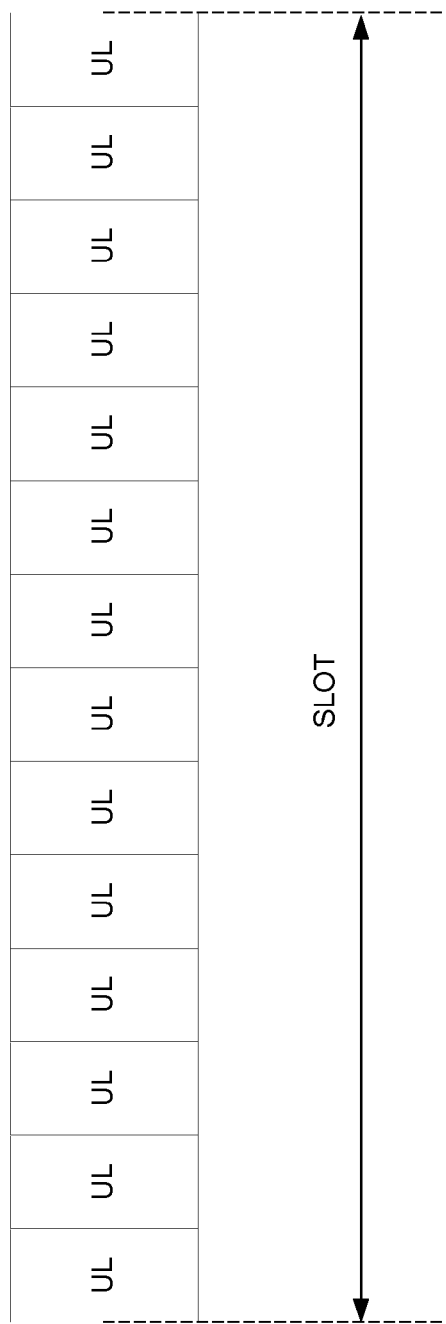
FIG. 8D is a block diagram of UL-only transmission according to some embodiments.

In addition to a slot may also be shortened to accommodate DL/UL transient period or both DL and UL transmissions. Potential variations are shown in FIG. 8A-8D. FIG. 8A shows a DL-only transmission with late start. FIG. 8B shows DL-heavy transmission with an UL part. FIG. 8C shows UL-heavy transmission with DL control. And FIG. 8D shows UL-only transmission.

Furthermore, NR also defines Type B scheduling, also known as mini-slots. Mini-slots are shorter than slots (according to current agreements from 1 or 2 symbols up to number of symbols in a slot minus one) and can start at any symbol. Mini-slots are used if the transmission duration of a slot is too long or the occurrence of the next slot start (slot alignment) is too late. Applications of mini-slots include among others latency critical transmissions (in this case both mini-slot length and frequent opportunity of mini-slot are important) and unlicensed spectrum where a transmission should start immediately after listen-before-talk succeeded (here the frequent opportunity of mini-slot is especially important). An example of mini-slots is shown in FIG. 9, where a mini-slot is shown as 2 OFDM symbols.

Operation in Unlicensed Spectrum

For a node to be allowed to transmit in unlicensed spectrum, e.g. the 5 GHz band, it typically needs to perform a clear channel assessment (CCA). This procedure typically includes sensing the medium to be idle for a number of time intervals. Sensing the medium to be idle can be done in different ways, e.g. using energy detection, preamble detection or using virtual carrier sensing. Where the latter implies that the node reads control information from other transmitting nodes informing when a transmission ends. After sensing the medium idle a node is typically allowed to transmit for a certain amount of time, sometimes referred to as transmission opportunity (TXOP). The length of the TXOP depends on regulation and type of CCA that has been performed, but typically ranges from 1 ms to 10 ms.

The mini-slot concept in NR allows a node to access the channel at a much finer granularity compared to e.g. LTE Licensed Assisted Access (LAA), where the channel could only be accessed at 500 us intervals. Using for example 60 kHz subcarrier-spacing and a two-symbol mini-slot in NR, the channel can be accessed at 36 us intervals.

Some embodiments propose signalling methods for LBT parameters for UL transmissions, e.g., in NR-U. In one or more embodiments, for example, the LBT parameters may be signaled so as to provide adaptability of an LBT setting, e.g., a type of LBT procedure to perform. This contrasts for instance with using a fixed LBT setting without adaptability, e.g., using a category 4 LBT as a baseline channel access procedure for an UL transmission. These and other embodiments may advantageously facilitate COT sharing between gNB and UE by signalling the LBT parameters that should be used by the UE to perform the channel sensing prior to the UL transmission.

In the following, the embodiments are described in the context of NR unlicensed spectrum (NR-U). But embodiments are not limited to NR-U scenarios. They are also applicable to other unlicensed operation scenarios such as Long Term Evolution (LTE) Licensed Assisted Access (LAA), eLAA, feLAA, MuLteFire, and the like.

Some embodiments facilitate COT sharing between the gNB and UE in a gNB initiated COT. The gNB according to some embodiments informs the UE about the LBT category, LBT priority class, and/or other channel access related parameters. Some embodiments do so by signaling a so-called channel access profile, e.g., as an example of the control information 28 in FIG. 1.

The term "channel access profile" is used herein as an example abstraction of two or more parameters which are related to channel access, e.g., that govern performance of an LBT procedure by the wireless device. A channel access profile comprises or indicates information in the form of parameters. The parameters may be indicated in indexed combinations, such that an index points out a specific combination of parameter values, e.g., from mapping 40 in FIG. 1. In some embodiments, channel access profiles are configured by RRC (via the system information or dedicated signaling).

In some embodiments, the parameters included or indicated by a channel access profile comprise at least one of the following:

LBT category preceding the transmission (CAT4, CAT2, or no LBT)

Cyclic Prefix (CP) extension: indication if the UE is expected to perform CP extension of the first symbol of the scheduled PUSCH Puncturing: indication if the UE is expected to perform puncturing of the first symbol of the scheduled PUSCH Priority Group. The priority group is linked to one or more of the following: (i) Specific one or set of LBT priority class; (ii) Specific one or set of logical channels; (iii) Specific one or set of QCI values.

Energy detection (ED) threshold

Each channel access profile may have an associated index.

In some embodiments, Downlink Control Information (DCI) signals to the UE an index that maps to one of the possible combinations, i.e., channel access profiles. The information can be carried in UE-specific or common DCI. As a non-limiting example, the channel access profile index is signalled in the DCI that indicates the granted UL allocation for the UE (e.g DCI 0_1).

Table 5 provides an example (non-comprehensive) list of possible combinations, with a corresponding index that is signaled for each possible combination, e.g., via DCI. Table 5 provides the signaling to support the example cases listed in Table 6.

TABLE 5 signalling for channel access profile

| Row index | LBT category | CP extension | Priority group |
|---|---|---|---|
| 0 | none | 0 | 0 |
| 1 | none | 0 | 1 |
| 2 | none | 0 | 2 |
| 3 | none | 0 | 3 |
| 4 | Cat2__16us | 0 | 0 |
| 5 | Cat2__16us | 0 | 1 |
| 6 | Cat2__16us | 0 | 2 |
| 7 | Cat2__16us | 0 | 3 |
| 8 | Cat2__25us | 0 | 0 |
| 9 | Cat2__25us | 0 | 1 |
| 10 | Cat2__25us | 0 | 2 |
| 11 | Cat2__25us | 0 | 3 |
| 12 | Cat2__25us | 1 | 0 |
| 13 | Cat2__25us | 1 | 1 |
| 14 | Cat2__25us | 1 | 2 |
| 15 | Cat2__25us | 1 | 3 |
| 16 | CAT 4 | 0 | 3 |

TABLE 6

UE behaviour in shared COT

| | LBT category | CP extension needed | Gaps | Functionality | Notes |
|---|---|---|---|---|---|
| DL to UL switch in a shared COT initiated by the gNB | CAT4 Sensing | NO | N.A | UE performs CAT4 LBT | |
| | No sensing | NO | gNB guarantees that the gap is less than or equal 16 us. | UE transmits immediately at the first scheduled symbol. | This can only happen in case of DL to UL switch, it is enough if the gNB guarantees that the gap is less than 16 us. No special behaviour at the UE. |
| | 16 us Sensing | NO | gNB guarantees that the gap is less than or equal 16 us | UE performs the LBT immediately before the first scheduled symbol. If a specific ED threshold is signaled, the UE uses it when sensing the channel. | Only applicable for gaps less than or equal 16 us when DL to UL case. This is not needed in case UL to UL. |
| | 25 us Sensing | NO | gNB guarantees that the gap is greater than or equal 25 us | UE performs the LBT immediately before the first scheduled symbol. If a specific ED threshold is signaled, the UE uses it when sensing the channel. | Works for both shared COT and pause txOP for the DL to UL switch. |
| UL to UL switch in a shared COT initiated by the gNB | 25 us Sensing | Yes | Gap should be exactly 25 us and not longer | First symbol of the scheduled PUSCH is extended. UE performs the LBT immediately before the transmission. If a specific ED threshold is signaled, the UE uses it when sensing the channel. | The gNB can introduce additional symbol gap based on the selection of the SLIV. Instead of extending the transmission by more than one symbols. |
| UL to DL in a shared COT initiated by the gNB | gNB guarantees that the exact needed gap based on the PUSCH SLIV and CP extension of the DL transmission without additional signalling | | | | |

Alternatively, the parameters are signalled using dedicated fields via DCI. Or, one or more of the parameters may be signaled using dedicated field(s), while one or more other parameter is signaled using an index. Another option is that an index is provided which indicates a complete parameter combination, but one or more of the parameters may still be provided via dedicated field(s), thus overriding the value included in the parameter combination indicated by the index. This will enable dynamic creation of new combinations, while still allowing benefitting from the virtues of index-based signaling.

There may be several different options regarding how the UE performs logical channel prioritization in relation to channel access profile.

In the first option, there is no additional mapping restriction imposed by a received channel access profile. The UE can take data from any logical channel based on existing mapping restrictions (such as allowedSCS-List, maxPUSCH-Duration, configuredGrantType1Allowed, allowedServingCells etc.), and multiplex the data in the same Medium Access Control (MAC) Protocol Data Unit (PDU).

In the second option, there is an additional mapping restriction imposed by a received channel access profile. In other words, for every logical channel, the RRC can configure a list of channel access profiles which are associated with the logical channel. In a simple way, a list of indices of channel access profiles are configured to be associated with each logical channel. Or, similarly, for every channel access profile index, a list of allowed logical channels is provided. In this option, for every UL grant received via a DCI, the UE MAC only selects data from logical channels which are associated with the channel access profile(s) indicated/carried by the DCI.

In some embodiments, which option is to be applied may be configured by the gNB per cell/carrier/BWP/LBT subband. The configuration may be signaled via RRC signaling or a MAC Control Element (CE). As another possibility, which option is to be applied for an UL grant may be carried in the DCI.

As another option, the herein described signaled information may be combined with multi-allocation scheduling, where a single DCI is used to signal multiple allocations of UL transmission resources. With this option, COT sharing may be eligible for the first one or more of the allocations, but not for the other(s) (or COT sharing may be possible for all the allocations). In case COT sharing is possible between subsequent allocations (i.e. UL-UL COT sharing), a single signaled channel access profile index may be applicable both for the DL-UL COT sharing and the UL-UL COT sharing case(s), or one channel access profile index may be provided for the first allocation (i.e. the DL-UL COT sharing) and another index for the UL-UL COT sharing or even one index for each UL-UL COT sharing occurrence among the multiple allocations. Optionally, a channel access index may be provided also for the allocations for which COT sharing is not possible. This may be one index for all such allocations or one index per allocation (or the index provided for the DL-UL COT sharing may be applicable for these allocations too).

Note that instead of indicating CP extension, the gNB in some embodiments indicates to the UE to puncture/shorten the start of the UL transmission. The corresponding information is also signalled as part of the channel access profile.

Note also that, in case the gNB indicates to the UE the need to extend the start of the transmission, the UE may extend the start of the first symbol of the scheduled PUSCH according to the following.

If sensing duration<symbol duration:

Symbol Duration−sensing Duration

Else

Symbol Duration−mod (sensing Duration, symbol duration)

For example: in case of LBT cat2 25 us sensing:
If operating using 15 KHz SCS, the UE extend the transmission by (71.35−25)=46,35 us
If operating using 30 KHz SCS, the UE extend the transmission by (35.68−25)=10.68 us
If operating using 60 KHz SCS, the UE extend the transmission by (17.84−mod(25,17.84))=10.68 us The UE performs the LBT immediately before the start of the transmission.

Figure 10:
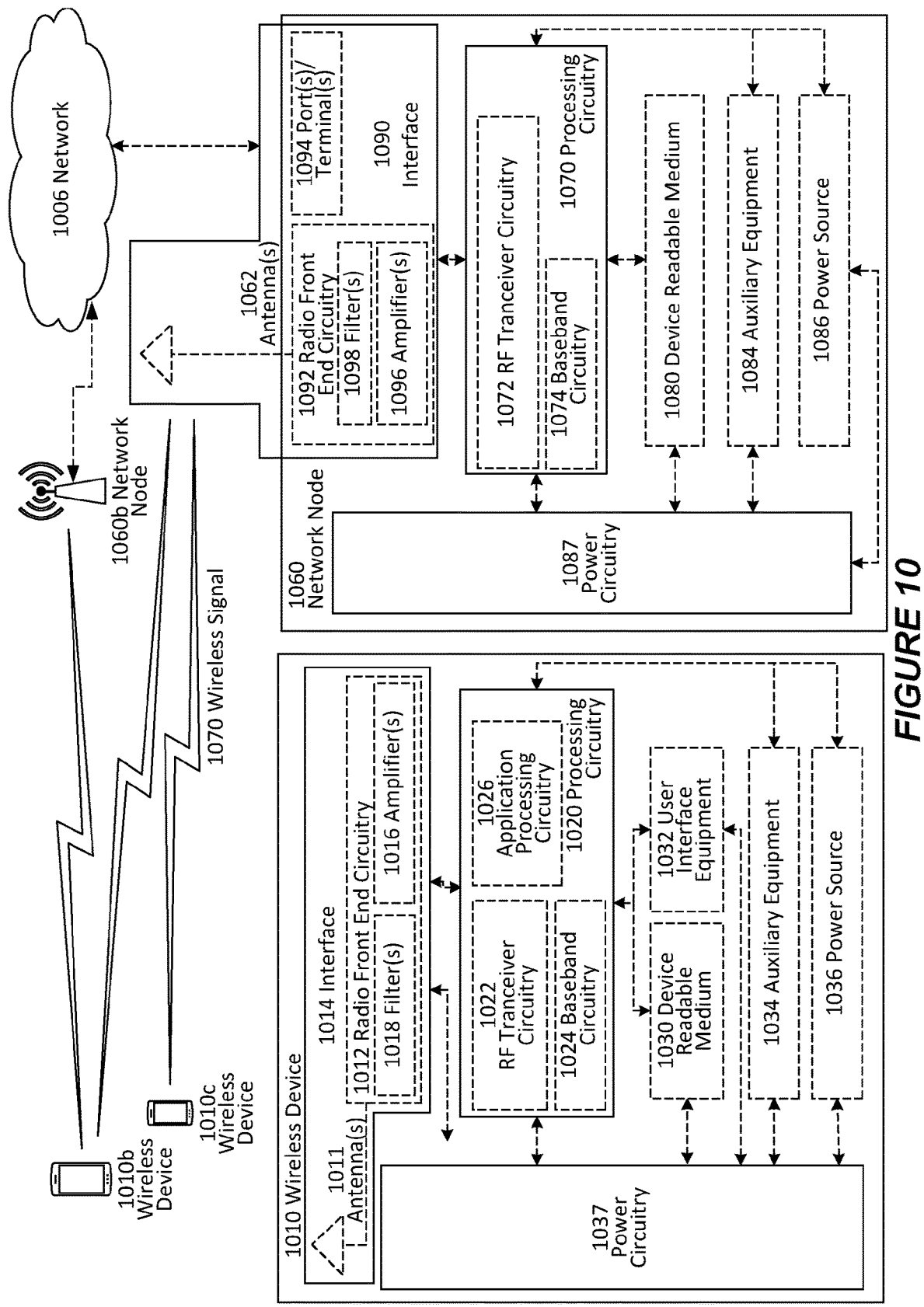
FIG. 10 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 and 1060b, and WDs 1010, 1010b, and 1010c. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptopembedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
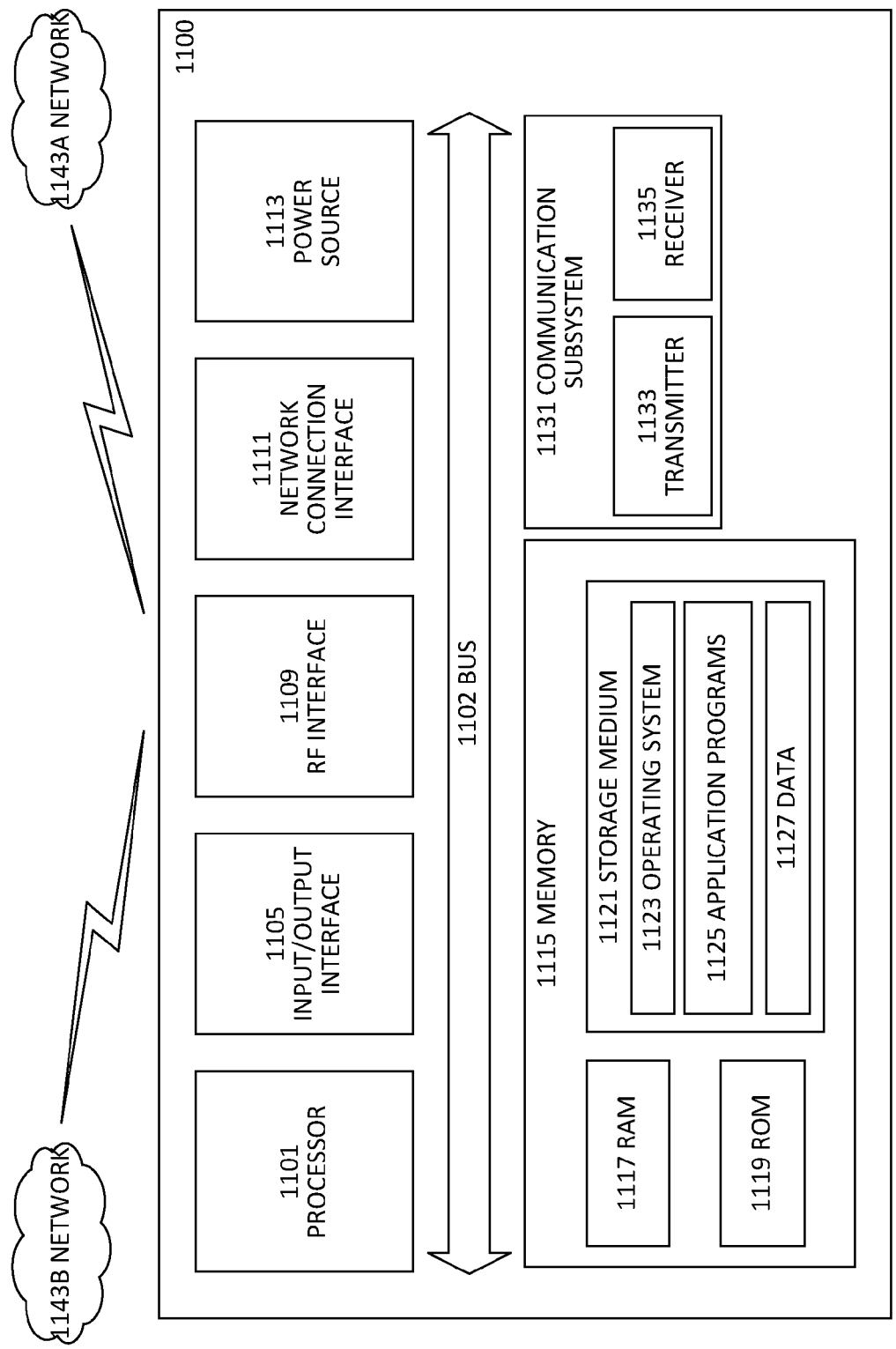
FIG. 11 is a block diagram of a user equipment according to some embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 11200 may be any UE identified by the $3^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143a may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
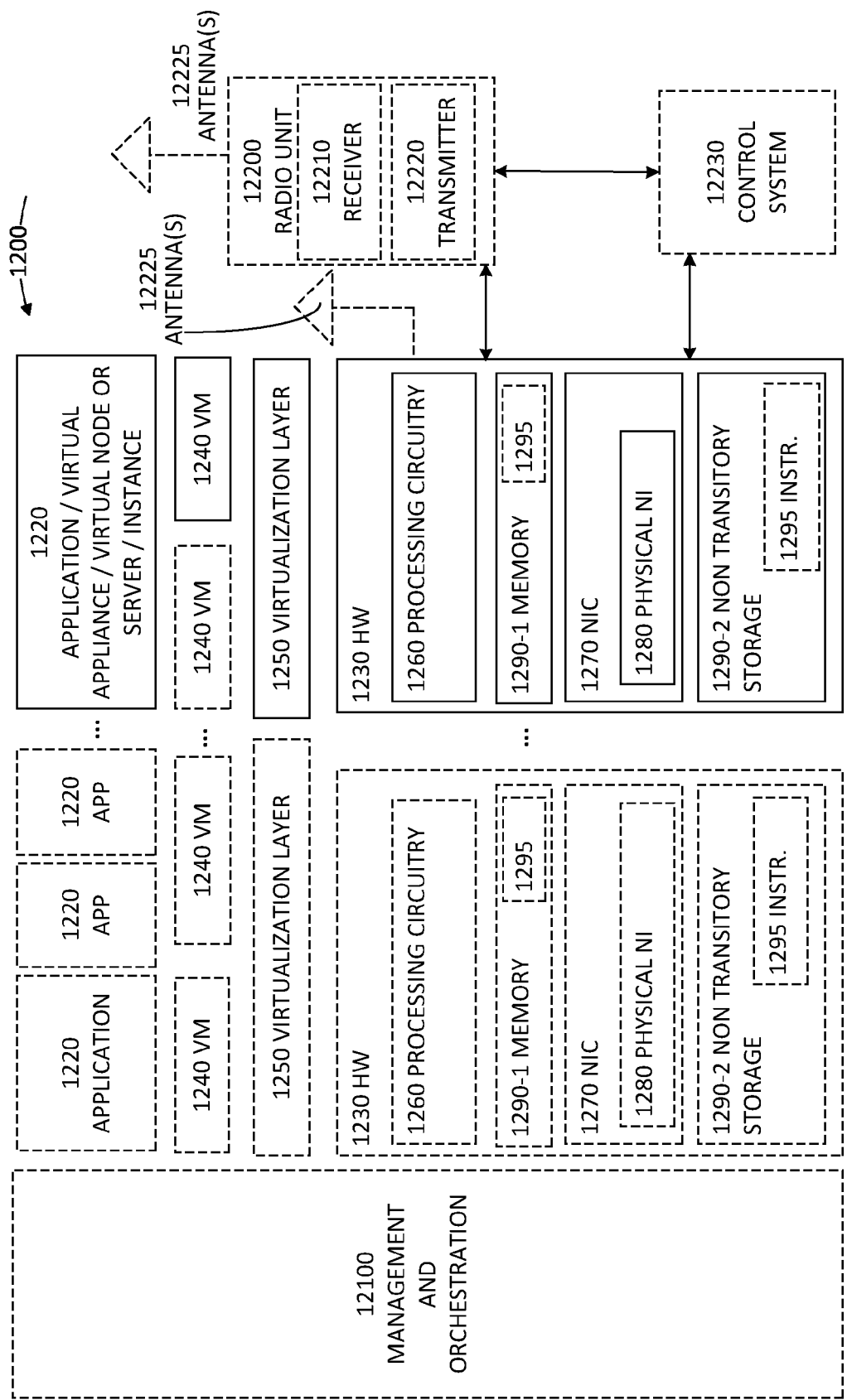
FIG. 12 is a block diagram of a virtualization environment according to some embodiments.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 13:
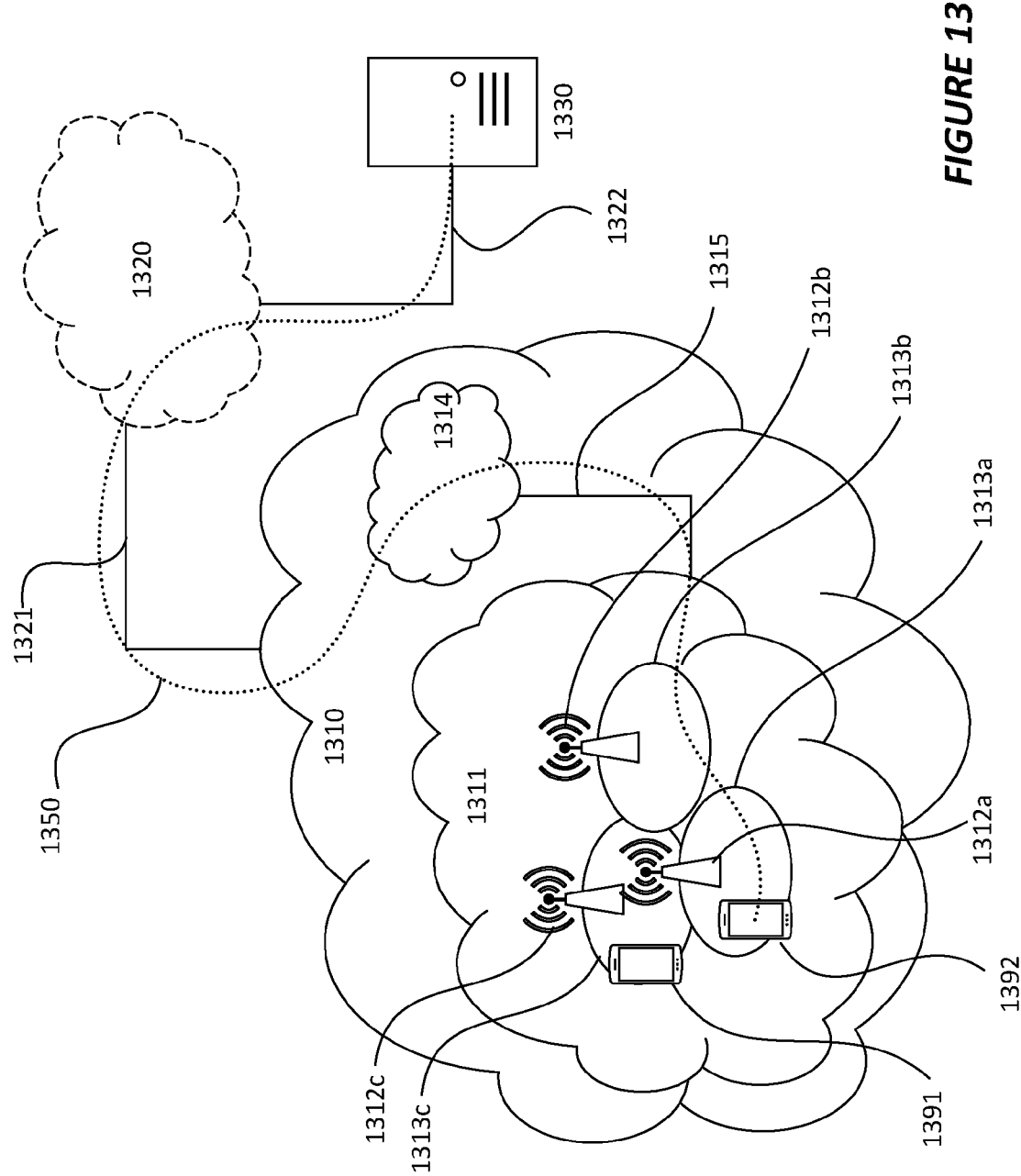
FIG. 13 is a block diagram of a communication network with a host computer according to some embodiments.

FIG. 13 illustrates a telecommunication network connected via an intermediate network to a host computer in accordance with some embodiments. In particular, with reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 14:
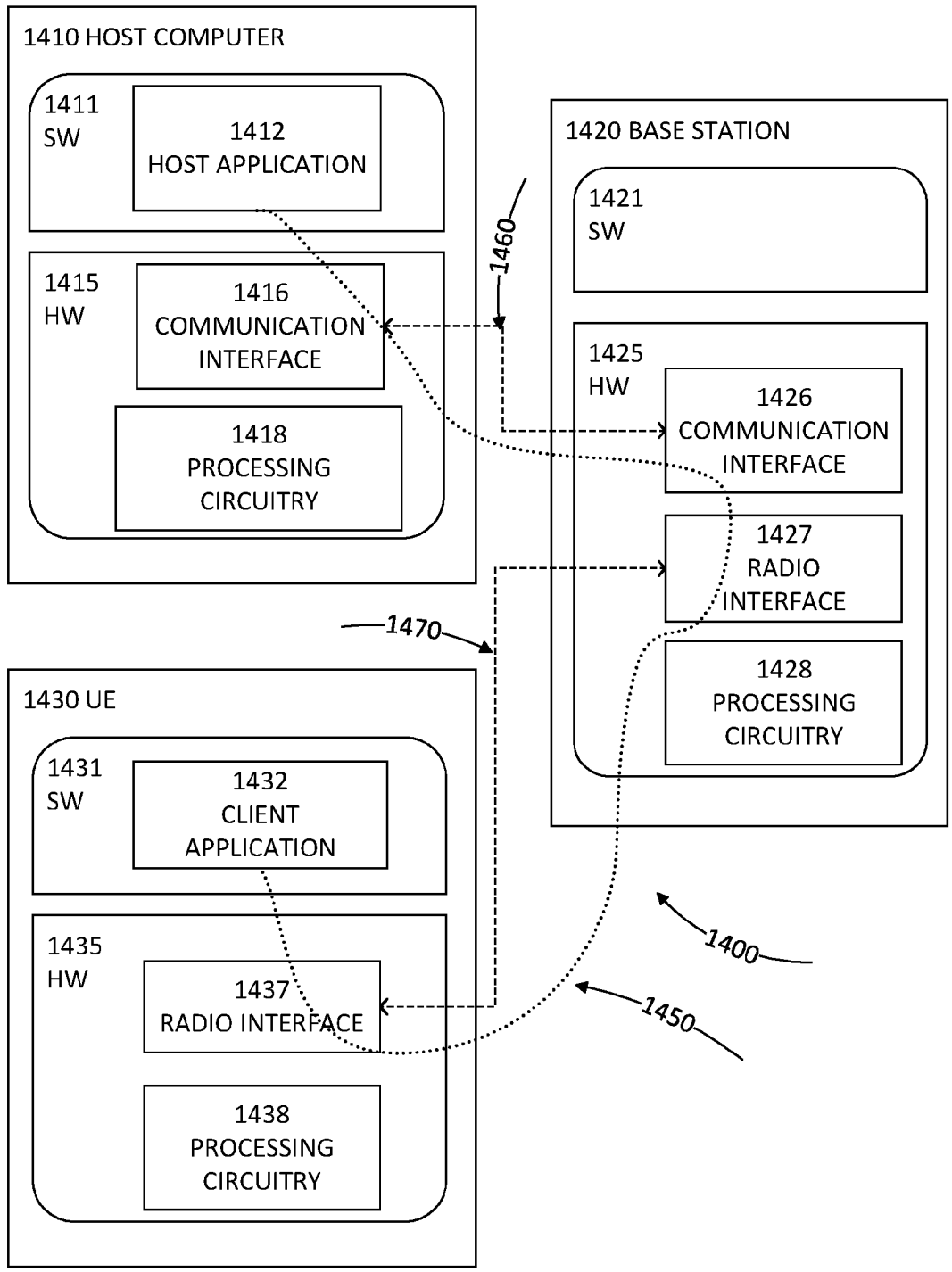
FIG. 14 is a block diagram of a host computer according to some embodiments.

Example implementations, in accordance with an embodiment, of the UE, base station and host computer discussed in the preceding paragraphs will now be described with reference to FIG. 14. FIG. 14 illustrates host computer communicating via a base station with a user equipment over a partially wireless connection in accordance with some embodiments In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 14 may be similar or identical to host computer 1330, one of base stations 1312*a*, 1312*b*, 1312*c* and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
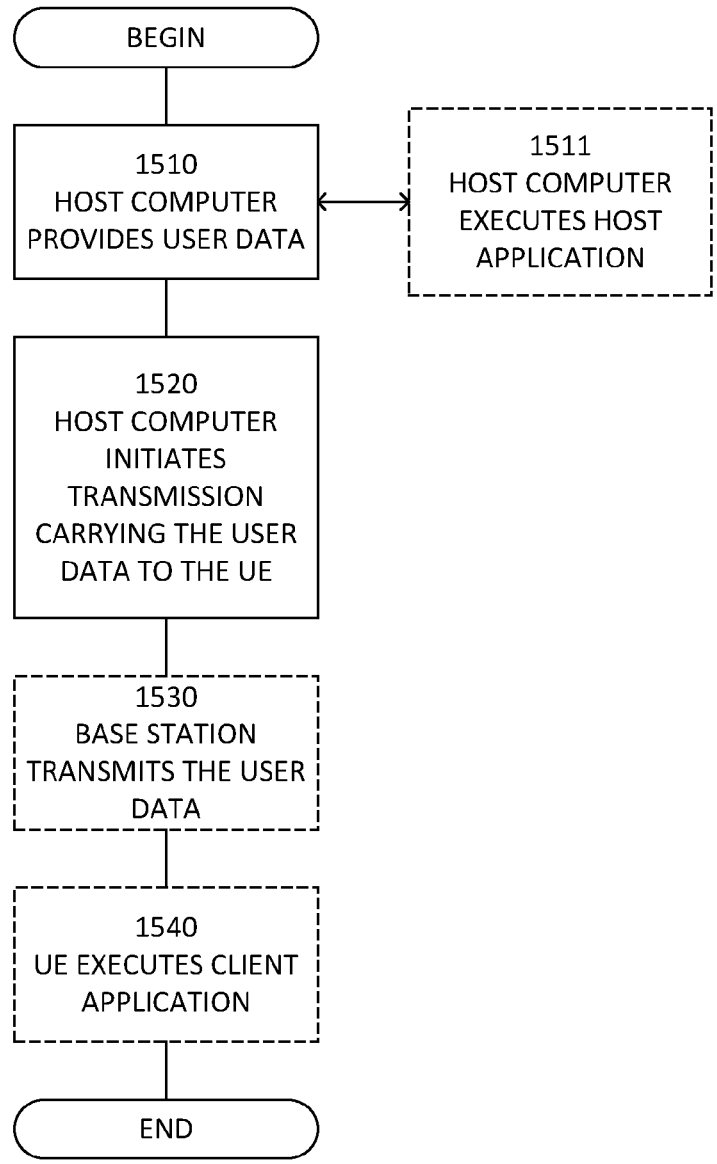
FIG. 15 is a flowchart illustrating a method implemented in a communication system, in accordance with one embodiment.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
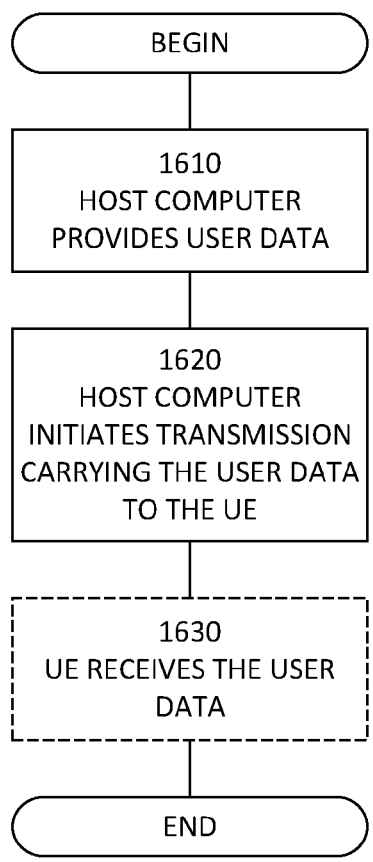
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
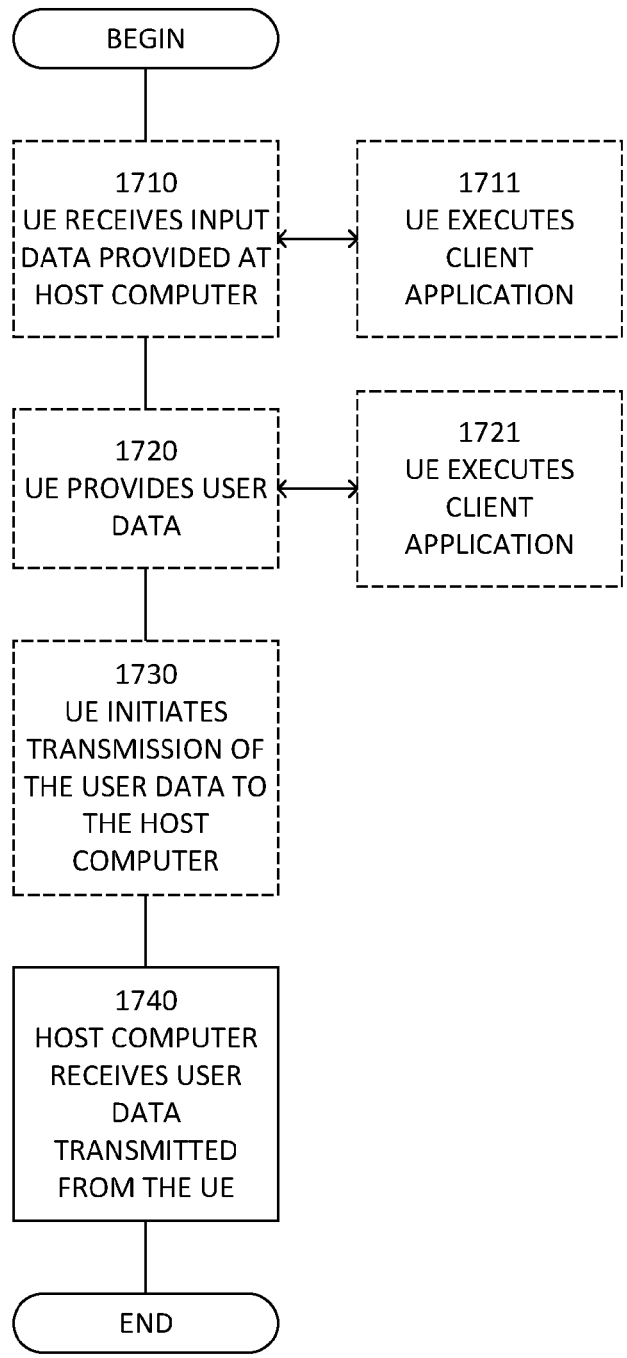
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
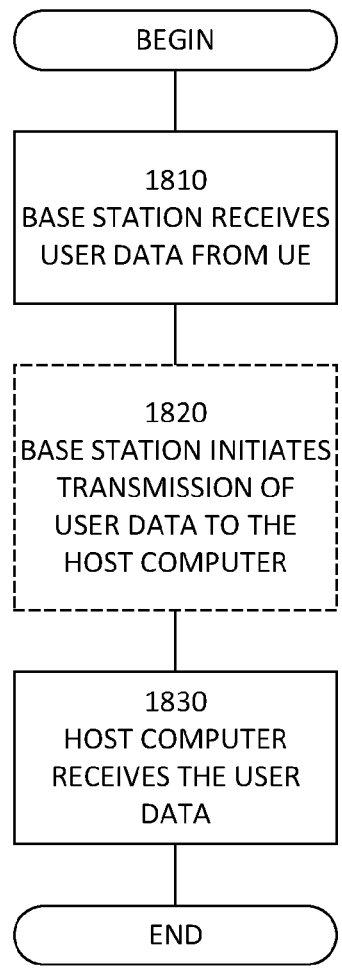
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a wireless device, the method comprising:
receiving control information that jointly encodes respective values for two or more channel access parameters that govern performance by the wireless device of a listen-before-talk (LBT) procedure prior to an uplink transmission in a radio resource allocation, wherein the two or more channel access parameters include:
a type of the LBT procedure that the wireless device must successfully complete before performing the uplink transmission in the radio resource allocation; and
a cyclic prefix extension to extend start of the uplink transmission in the radio resource allocation, and
wherein the control information also individually encodes one or more respective values for one or more of the two or more channel access parameters, and wherein the method further comprises, for any channel access parameter whose value is both individually encoded and jointly encoded by the control information, determining a value for the channel access parameter from the individual encoding of that channel access parameter.

2. The method of claim 1, wherein the two or more channel access parameters further include:
one or more priorities to be used for the LBT procedure;
whether or not the wireless device is to extend or puncture the start of the uplink transmission in the radio resource allocation; or
an energy detection threshold to be used for the LBT procedure.

3. The method of claim 2, wherein the one or more priorities include one or more LBT priority classes, one or more logical channels, and/or one or more quality of service class indicators.

4. The method of claim 1, further comprising performing the LBT procedure according to the received control information, and performing or not performing the uplink transmission in the radio resource allocation depending on whether or not the LBT procedure succeeds.

5. The method of claim 1, wherein the control information comprises Downlink Control Information (DCI).

6. The method of claim 1, wherein a mapping maps different indices to different combinations of values for the two or more channel access parameters, wherein the control information comprises an index mapped by said mapping to one of the different combinations of values for the two or more channel access parameters.

7. The method of claim 1, wherein different combinations of values for the two or more channel access parameters are associated with respective logical channels, and wherein the method further comprises selecting, from one or more logical channels associated with a combination of values for the two or more channel access parameters jointly encoded by the control information, data for the uplink transmission in the radio resource allocation.

8. The method of claim 1, wherein the two or more channel access parameters govern performance of an LBT procedure by the wireless device when a channel occupancy time (COT) on an unlicensed frequency channel is shared.

9. A method performed by a network node, the method comprising:
transmitting, to a wireless device, control information that jointly encodes respective values for two or more channel access parameters that govern performance by the wireless device of a listen-before-talk (LBT) procedure prior to an uplink transmission in a radio resource allocation, wherein the two or more channel access parameters include:
- a type of the LBT procedure that the wireless device must successfully complete before performing the uplink transmission in the radio resource allocation; and
- a cyclic prefix extension to extend start of the uplink transmission in the radio resource allocation, and
- wherein the control information also individually encodes one or more of the two or more channel access parameters, wherein, for any channel access parameter that is both individually encoded and jointly encoded by the control information, a value of the channel access parameter as individually encoded overrides a value of the channel access parameter as jointly encoded.

10. The method of claim 9, wherein the two or more channel access parameters further include:
- one or more priorities to be used for the LBT procedure;
- whether or not the wireless device is to extend or puncture the start of the uplink transmission in the radio resource allocation; or
- an energy detection threshold to be used for the LBT procedure.

11. The method of claim 10, wherein the one or more priorities include one or more LBT priority classes, one or more logical channels, and/or one or more quality of service class indicators.

12. The method of claim 9, wherein the control information comprises Downlink Control Information (DCI).

13. The method of claim 9, comprising transmitting, to the wireless device, signaling indicating a mapping, wherein the mapping maps different indices to different combinations of values for the two or more channel access parameters, wherein the control information comprises an index mapped by said mapping to one of the different combinations of values for the two or more channel access parameters.

14. The method of claim 9, wherein different combinations of the two or more channel access parameters are associated with respective logical channels.

15. The method of claim 9, wherein the two or more channel access parameters govern performance of an LBT procedure by the wireless device when a channel occupancy time (COT) on an unlicensed frequency channel is shared.

16. A wireless device comprising:
communication circuitry; and
processing circuitry configured to receive control information that jointly encodes respective values for two or more channel access parameters that govern performance by the wireless device of a listen-before-talk (LBT) procedure prior to an uplink transmission in a radio resource allocation, wherein the two or more channel access parameters include:
- a type of the LBT procedure that the wireless device must successfully complete before performing the uplink transmission in the radio resource allocation; and
- a cyclic prefix extension to extend start of the uplink transmission in the radio resource allocation, and
- wherein the control information also individually encodes one or more of the two or more channel access parameters, wherein, for any channel access parameter that is both individually encoded and jointly encoded by the control information, a value of the channel access parameter as individually encoded overrides a value of the channel access parameter as jointly encoded.

17. A network node comprising:
communication circuitry; and
processing circuitry configured to transmit, to a wireless device, control information that jointly encodes respective values for two or more channel access parameters that govern performance by the wireless device of a listen-before-talk (LBT) procedure prior to an uplink transmission in a radio resource allocation, wherein the two or more channel access parameters include:
- a type of the LBT procedure that the wireless device must successfully complete before performing the uplink transmission in the radio resource allocation; and
- a cyclic prefix extension to extend start of the uplink transmission in the radio resource allocation, and
- wherein the control information also individually encodes one or more of the two or more channel access parameters, wherein, for any channel access parameter that is both individually encoded and jointly encoded by the control information, a value of the channel access parameter as individually encoded overrides a value of the channel access parameter as jointly encoded.

* * * * *